No. 669,563. Patented Mar. 12, 1901.
W. B. TYLER.
GRAIN AND FODDER SHOCKER.
(Application filed July 28, 1900.)
(No Model.) 2 Sheets—Sheet 1.

Witnesses:
H. C. Rodgers
J. M. Boling

Inventor:
W. B. Tyler.
By Fischer & Thorpe
Attys

No. 669,563. Patented Mar. 12, 1901.
W. B. TYLER.
GRAIN AND FODDER SHOCKER.
(Application filed July 28, 1900.)

(No Model.) 2 Sheets—Sheet 2.

Witnesses:
H. C. Rodgers
J. W. Boling

Inventor
W. B. Tyler.
By Fischer & Thorpe
Attys.

UNITED STATES PATENT OFFICE.

WELLINGTON B. TYLER, OF DRIFTWOOD TOWNSHIP, OKLAHOMA TERRITORY.

GRAIN AND FODDER SHOCKER.

SPECIFICATION forming part of Letters Patent No. 669,563, dated March 12, 1901.

Application filed July 28, 1900. Serial No. 25,132. (No model.)

*To all whom it may concern:*

Be it known that I, WELLINGTON B. TYLER, a citizen of the United States, residing in Driftwood township, Woods county, Oklahoma Territory, have invented a new and useful Grain and Fodder Shocker, of which the following is a specification.

My invention relates to corn-shocking machines; and my object is to produce a machine of this character which can be efficiently operated by one man and which possesses the desirable features of simplicity, strength, durability, and cheapness of construction.

To these ends the invention consists in certain novel and peculiar features of construction and combinations of parts, as hereinafter described and claimed, and in order that it may be fully understood reference is to be had to the accompanying drawings, in which—

Figure 1:
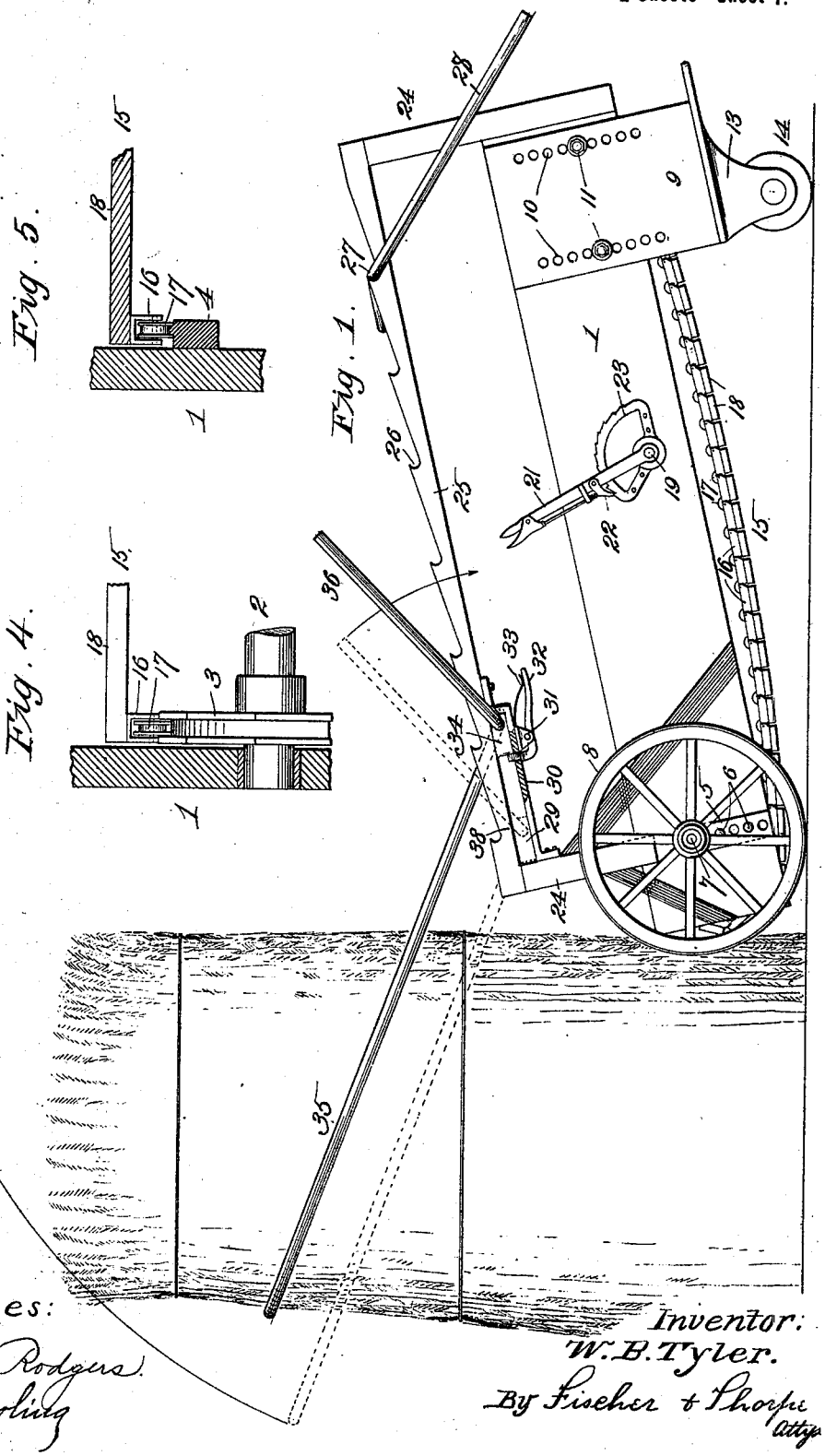
Figure 2:
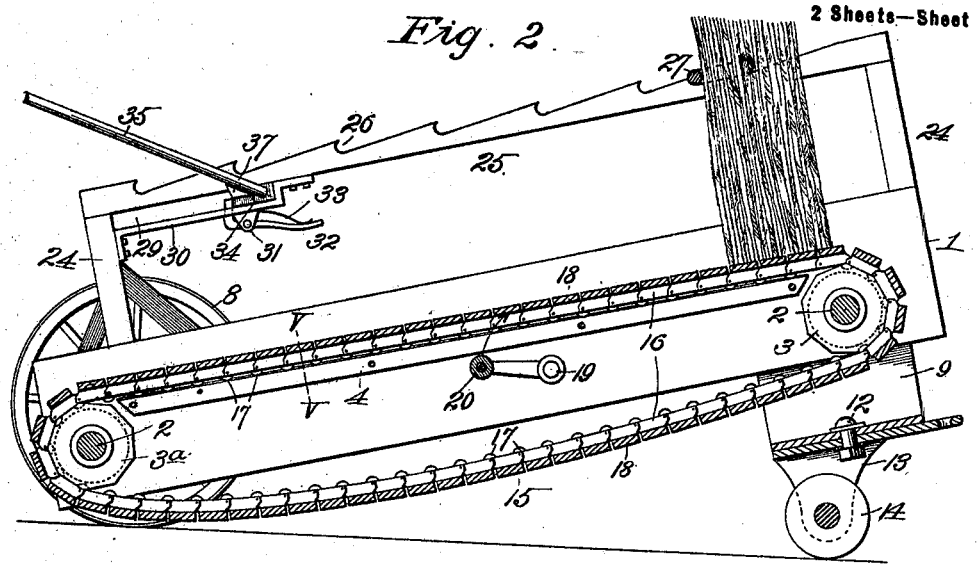
Figure 3:
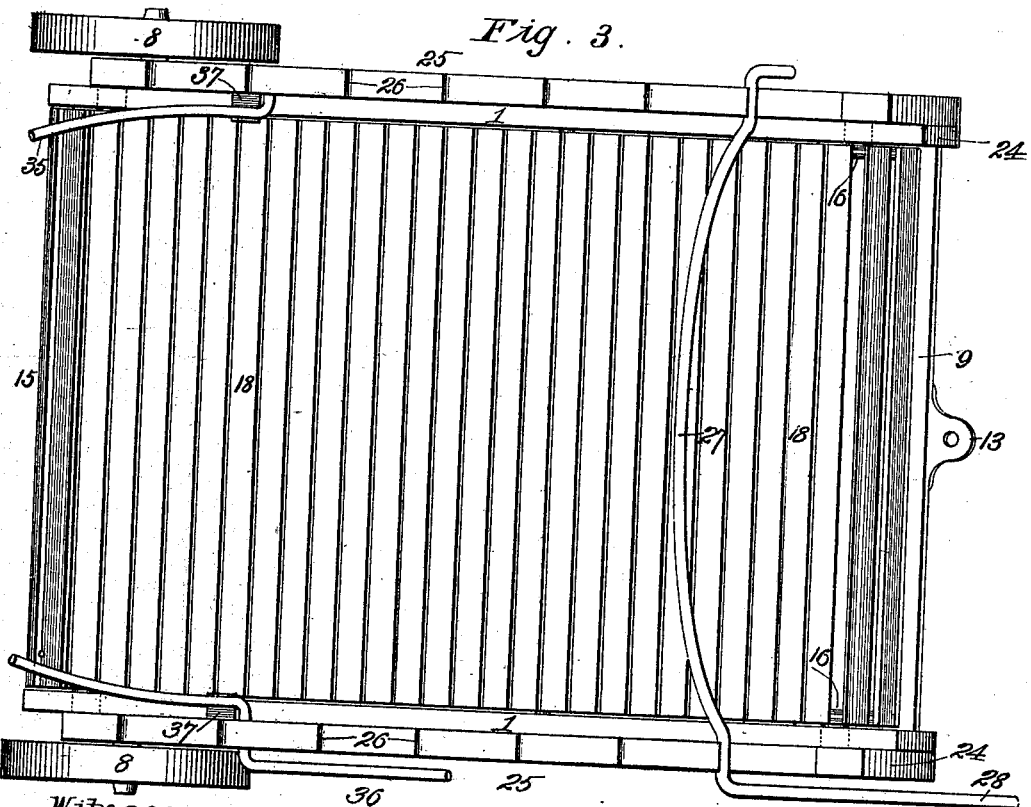

Figure 1 represents a side elevation of a corn-shocker embodying my invention, the same being arranged as in the act of discharging a completed shock of corn upon the ground. Fig. 2 is a vertical longitudinal section of the same. Fig. 3 is a top plan view of the same. Fig. 4 is a detail section showing the relation between the rollers and the endless conveyer. Fig. 5 is a section taken on the line V V of Fig. 2.

Referring now to the drawings in detail, 1 designates the sides of the machine, the same being connected near their front and rear ends by the shafts 2, journaled in the sides and carrying rollers 3 3ª, which may be circular or formed with a plurality of flat sides, as shown, and secured to sides 1 are the inwardly-projecting track-rails 4, the same extending from one roller to the other and having their upper sides in about the same plane as the highest point of said rollers, as shown clearly in Fig. 2. Secured externally to sides 1 near their rear ends are perforated brackets 5, adjustably secured in position by one or more bolts 6, and provided at their upper ends, by preference, with outwardly-projecting trunnions 7, on which are journaled the rear carrying-wheels 8. By this arrangement the rear or discharge end of the machine can be raised or lowered.

9 designates a U-shaped frame externally embracing sides 1 near their front ends and provided with a plurality of holes 10 to engage bolts 11, projecting from sides 1, in order that said frame may be vertically adjusted, and said frame is swiveled or pivoted, as at 12, upon the bracket 13, carrying a caster 14.

15 designates an endless conveyer connecting rollers 3 3ª and supported midway between said rollers by the track-rails 4, so as to provide a firm and substantial support for the corn built into shocks thereon, as will hereinafter appear. This conveyer consists of a plurality of links 16, U-shaped in cross-section and pivotally connected together, grooved rollers 17 being journaled upon the pivots at the junction-points of the links, as shown, said rollers being adapted to travel rearwardly upon track-rails 4 with but little friction, the rollers 3 3ª being arranged as guides for the ends of the conveyer and to receive the links by preference, in order that the conveyer-rollers shall not strike against the front end of the track-rails or drop as they clear the rear ends thereof, and connecting opposite links, so as to complete the conveyer, are cross-slats 18, the same being riveted or bolted to links 16.

Owing to the downward and rearward inclination of the conveyer and the minimum friction with which it operates its gravitative tendency is to travel continuously rearward, and in order to prevent such action at times I provide a brake, the same comprising a crank-shaft 19, journaled in the sides 1 and arranged between the upper and lower strands of the conveyer, the crank of said shaft being preferably provided with a roller 20, which is adapted to be swung up against the under side of the top strand of the conveyer, as indicated by the arrow in Fig. 2, by means of the lever 21, and locked in such position by means of the spring-actuated dog 22, carried by said lever and engaging the toothed sector 23, secured externally to one of the sides 1.

Erected upon the wheeled framework described is a superstructure comprising standards 24 at or near each corner of the machine, the standards at each side being connected together by a longitudinal bar 25, provided with notches 26.

27 designates a cross-bar, preferably curved and journaled in oppositely-alined notches 26, and provided at one end with a handle 28 for convenience of manipulation. This rod, stretching from one side to another, is adapted to support the corn in an upright position as it is piled loosely upon the conveyer and as the shock grows larger to be transferred successively to the next notches rearward until eventually enough corn is standing upon the conveyer to form a shock of the size desired, as will be hereinafter alluded to.

To prevent the shock as it is discharged at the rear end of the machine from any possibility of toppling over, I provide the following construction:

29 designates a pair of longitudinal slots at opposite sides and at the rear end of the superstructure, the same being formed by securing angle-bars 30 to the rear standards 24 and bars 25, and pivoted to a bracket 31, depending from said bars, are a pair of dogs 32, having their rear ends pressed yieldingly up through angle-bars 30 into said slots by means of springs 33 in order to prevent the slidable boxes 34 being forced rearward in said slots, said boxes forming a journal for the U-shaped frame 35, provided at one side with a handle 36, said frame being prevented from assuming a more depressed position than that shown by the inwardly-projecting arm 37 of boxes 34.

In practice this machine is coupled to a corn cutter or harvester, and the corn is placed in an upright position upon the front end of the conveyer and against the cross-bar 27, as shown in Fig. 2, the brake-roller 20 at this time being set. When the space forward of said bar is about filled, the operator by grasping handle 28 disengages bar 27 from the first set of notches 26 and places it in the next set to the rear. As soon as rod 27 has been properly adjusted the brake is thrown off and the weight of the corn causes the conveyer to travel rearward until its movement is arrested by the corn coming again in contact with cross-bar 27, after which he resets the brake, and the operation of piling corn upon the front end of the conveyer is continued until said space is again filled. He then transfers cross-rod 27 to the next set of notches, releases the brake to permit the corn and conveyer to gravitate rearward until again arrested by said cross-bar. The brake being then reset the piling operation again takes place, and these operations are repeated until the cross-bar 27 is at or near the rear end of the superstructure and sufficient corn is upon the traveling conveyer to form a shock of the size desired. The attendant now ties the shock in the customary manner, then withdraws bar 27 and releases the brake, and as a result the weight of the corn causes the conveyer to move rearward and deposit the shock of corn upon the ground in an upright position, all possibility of the shock toppling over being prevented because it is embraced by the frame 35, as shown in full lines, Fig. 1. He now depresses dogs 32 and shoves frame 35 rearward to the position shown in dotted lines, Fig. 1, the boxes 34 sliding in slots 29, as will be readily understood. This adjustment of the frame throws the same sufficiently rearward to permit the operator by grasping handle 36 to swing it downward and raise the frame above and over the shock, as indicated by the arrow, Fig. 1. It is then slid forward again and automatically secured in its advanced position by dogs 32. The brake 20 being now set and bar 27 placed in the front notches the machine is in condition for the formation of a new shock thereon, as will be readily understood.

From the above description it will be apparent that I have produced a corn-shocking machine which embodies the features of advantage enumerated as desirable in the statement of invention, and while I have shown and described the preferred embodiment of the same it is to be understood that it is susceptible of various changes as regards the detail construction and arrangement of the parts without departing from the spirit and scope or sacrificing any of the advantages.

Having thus described the invention, what I claim as new, and desire to secure by Letters Patent, is—

1. A corn-shocking machine, comprising a wheeled frame, a traveling conveyer extending obliquely downward and rearward therein, a superstructure upon said wheeled frame, and a cross-bar adjustably mounted on said superstructure, substantially as described.

2. A corn-shocking machine, comprising a wheeled frame, a traveling conveyer extending obliquely downward and rearward therein, a superstructure upon said wheeled frame, a cross-bar adjustably mounted on said superstructure, and a brake to prevent the operation of said conveyer at times, substantially as described.

3. A corn-shocking machine, comprising a wheeled frame, a traveling conveyer extending obliquely downward and rearward therein, a superstructure upon said wheeled frame, a cross-bar adjustably mounted on said superstructure, and a pivoted frame to embrace the completed shock as it is deposited upon the ground by the conveyer and prevent it falling over, substantially as described.

4. A corn-shocking machine, comprising a wheeled frame, a traveling conveyer extending obliquely downward and rearward therein, a superstructure upon said wheeled frame, a cross-bar adjustably mounted on said superstructure, and a pivoted frame to embrace the completed shock as it is deposited upon the ground from the conveyer and prevent it falling over; said frame being adjustable longitudinally of the wheeled frame, substantially as described.

5. A corn-shocking machine, comprising a wheeled frame, a traveling conveyer extending obliquely downward and rearward therein, a superstructure upon said wheeled frame, a cross-bar adjustably mounted on said superstructure, a pivoted frame to embrace the completed shock as it is deposited upon the ground from the conveyer and prevent it falling over, said frame being adjustable longitudinally of the wheeled frame, and dogs to prevent an extended rearward movement of said frame, substantially as described.

6. A corn-shocking machine, comprising a wheeled frame, guide-rollers at the front and rear ends of the same, guide-tracks between said rollers, an endless conveyer mounted upon said rollers and provided with rollers traveling on said tracks; said conveyer extending downward and rearward, and means to support corn in an upright position upon said conveyer; said means being adjustable rearward on the machine so as to accommodate a growing volume of corn upon the conveyer, substantially as described.

7. A corn-shocking machine, comprising a wheeled frame, guide-rollers at the front and rear ends of the same, guide-tracks between said rollers, an endless conveyer mounted upon said rollers and provided with rollers traveling on said tracks; said conveyer extending downward and rearward, means to support the corn in an upright position upon said conveyer; said means being adjustable rearward on the machine so as to accommodate a growing volume of corn upon the conveyer, and a brake journaled in the wheeled frame and adapted to engage the under side of that portion of the conveyer resting upon said tracks, substantially as described.

8. A corn-shocking machine, comprising a wheeled frame, a traveling conveyer extending obliquely downward and rearward therein, a superstructure upon said wheeled frame, provided with a plurality of notches, and a cross-bar to engage said notches, substantially as and for the purpose described.

9. A corn-shocking machine, comprising a pair of parallel sides, wheels carrying the rear end of the same and vertically adjustable with relation thereto, a frame adjustable upon the front ends of said sides, a caster swiveled to said frame and supporting the front end of the machine, shafts journaled in said sides and provided with rollers, the front shaft being in a higher plane than the rear shaft, track-rails projecting inwardly from said sides and sloping downward from the front to the rear roller, an endless conveyer mounted upon said rollers, and consisting of links pivoted together, rollers journaled in said links and engaging the said track-rails, and cross-slats connecting said links, a superstructure on the wheeled frame, an adjustable cross-bar carried thereby, and a brake mechanism to prevent the operation of the conveyer at times, substantially as described.

In testimony whereof I affix my signature in the presence of two witnesses.

WELLINGTON B. TYLER.

Witnesses:
WILLIAM A. TYLER,
FRANK SHEDDY.